June 16, 1942.  H. J. MURPHY  2,286,992
LATCH MECHANISM
Filed July 19, 1939  3 Sheets-Sheet 1

INVENTOR
HOWARD J. MURPHY
by John Todd ATT'Y.

June 16, 1942.    H. J. MURPHY    2,286,992
LATCH MECHANISM
Filed July 19, 1939    3 Sheets-Sheet 2
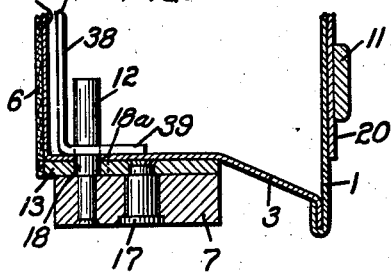
Fig. 6.
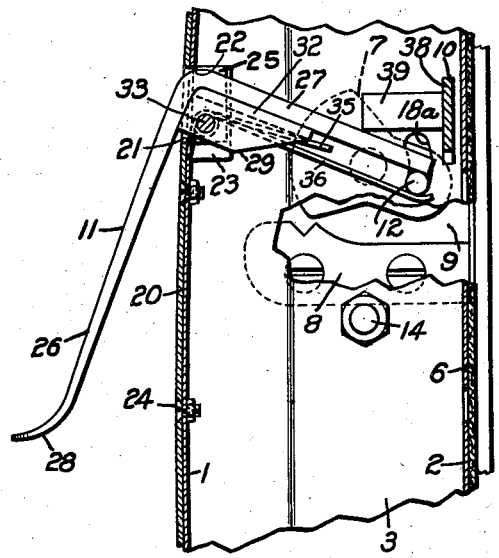
Fig. 7.
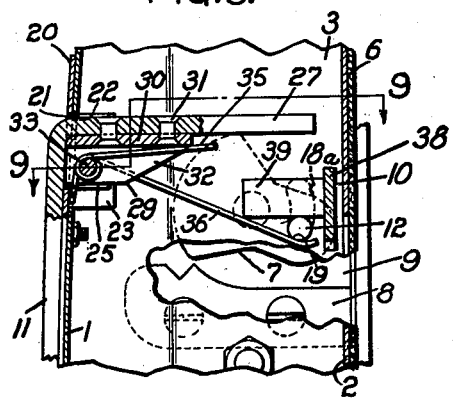
Fig. 8.
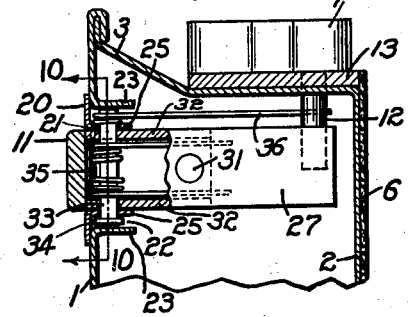
Fig. 9.
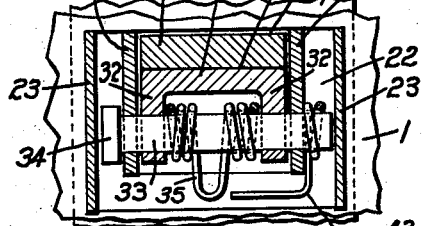
Fig. 10.
Fig. 13.
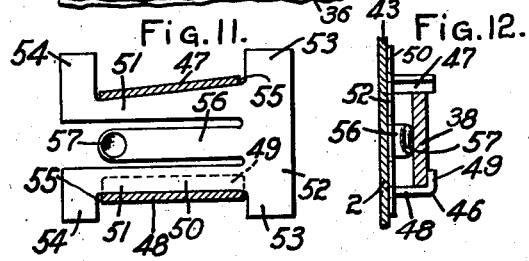
Fig. 11.   Fig. 12.
INVENTOR
HOWARD J. MURPHY
by John Todd ATT'Y.

June 16, 1942. H. J. MURPHY 2,286,992
LATCH MECHANISM
Filed July 19, 1939 3 Sheets-Sheet 3
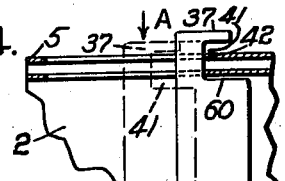
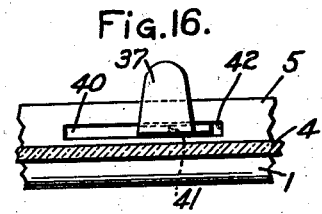
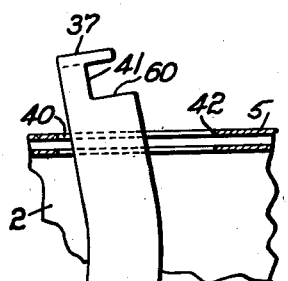
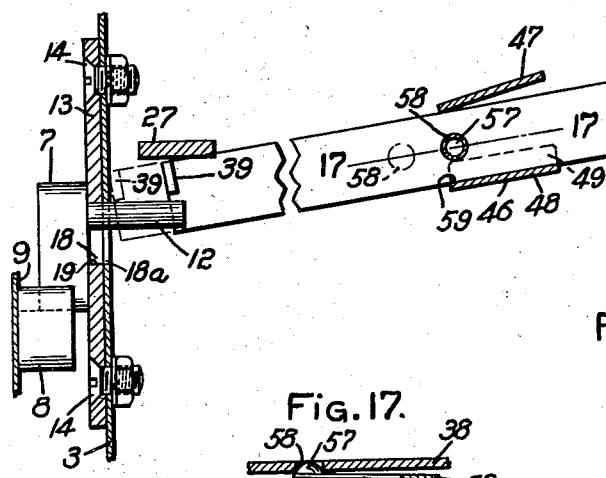
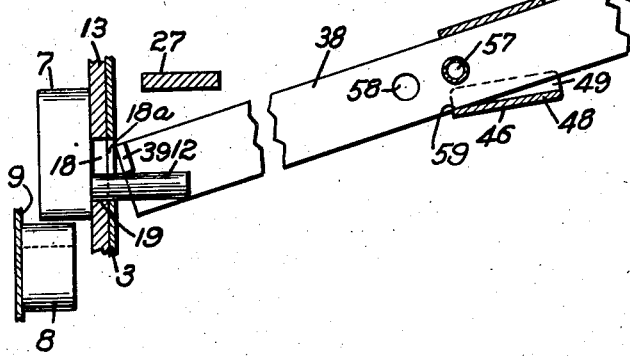
INVENTOR
HOWARD J. MURPHY
by John Todd ATT'Y.

Patented June 16, 1942

2,286,992

UNITED STATES PATENT OFFICE 2,286,992

LATCH MECHANISM

Howard J. Murphy, Greenwood, Mass., assignor to United-Carr Fastener Corporation, Cambridge, Mass., a corporation of Massachusetts Application July 19, 1939, Serial No. 285,248

2 Claims. (Cl. 292—226)

This invention relates to a latching mechanism for closures and is particularly applicable to door latches of automobile vehicles.

Referring to the drawings, in which I have illustrated preferred embodiments of my invention as applied to the door of an automobile:

Fig. 6 is a section along the line 6—6 of Fig. 3;

Fig. 7 is a section along the line 7—7 of Fig. 1 showing the latch bolt retracted by means of the outside handle;

Fig. 8 is a view similar to Fig. 7 but showing the manner in which the latch bolt is retracted by the inside handle;

Fig. 9 is a section taken along the line 9—9 of Fig. 8;

Fig. 10 is an enlarged section on the line 10—10 of Fig. 9;

Fig. 11 is an enlarged elevation partly in section of the inside handle retainer spring and supporting means;

Fig. 12 is an enlarged section taken along the line 12—12 of Fig. 1;

Fig. 13 is an enlarged section taken along the line 13—13 of Fig. 1;

Fig. 14 is a diagrammatic view of the latch mechanism showing the inside handle in position to lock the bolt against retraction by the outer handle, normal position of the inner handle being shown by dotted lines;

Fig. 15 is a view similar to Fig. 14 showing normal operation of the inner handle to retract the latch bolt;

Fig. 16 is a plan view looking in the direction of the arrow A of Fig. 14; and

Fig. 17 is a section taken along the line 17—17 of Fig. 14.

Figure 1:
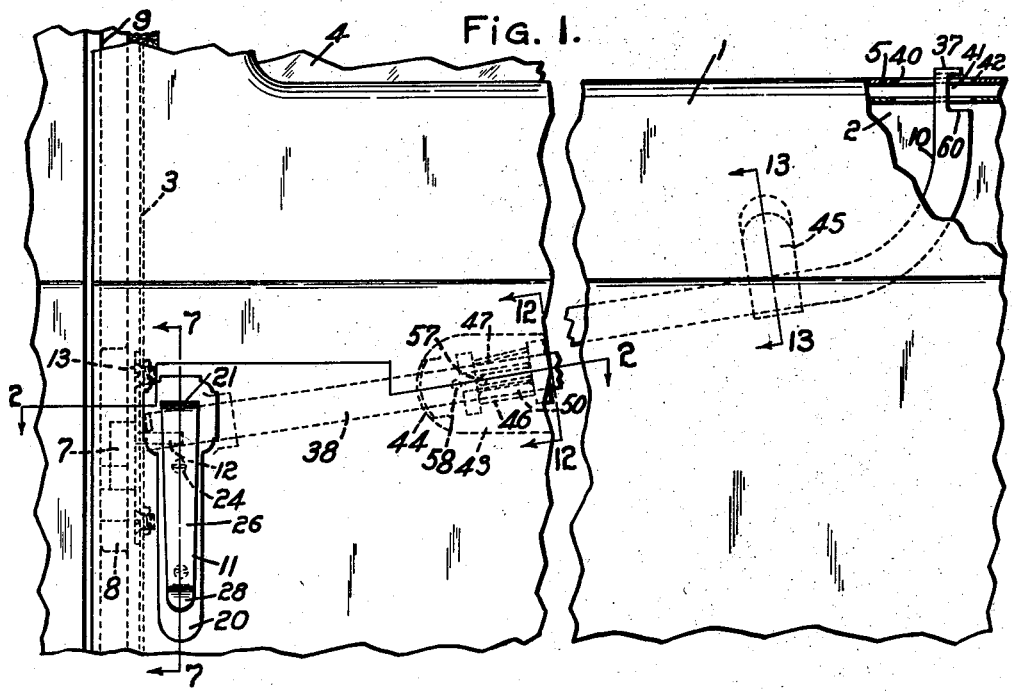
Fig. 1 is an elevation of an automobile door taken from the outside of the door with the door partly broken away.
Figure 2:
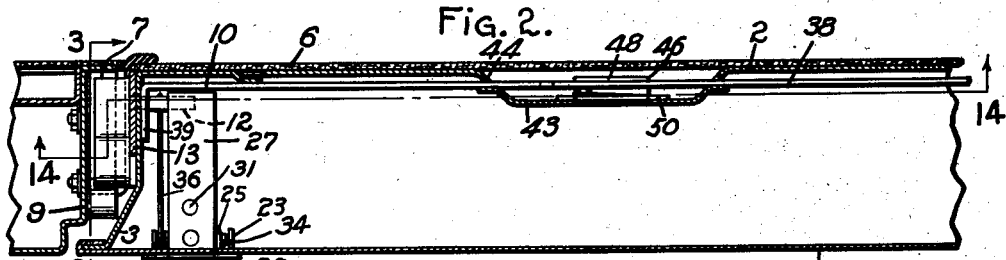
Fig. 2 is a sectional view partly in elevation along the line 2—2 of Fig. 1.

Referring to Figs. 1 and 2 of the drawings, I have shown a portion of an automobile door including an outer side 1, an inner side 2 and an edge 3. The door is of the type now commonly used and provides window glass 4 (Figs. 1 and 16) extending upwardly through a substantially horizontally disposed window casing 5. An upholstery panel 6 is mounted upon the outer surface of the inner side 2, as is the custom in automobile manufacture. A latch bolt 7 is pivotally disposed outside an edge 3 of the door for cooperating latching engagement with a keeper 8 secured to a door jamb 9 (Fig. 2). An inner handle 10 and an outer handle 11 are assembled with respective inner and outer sides of the door and provide actuating portions disposed within the door and operable upon a crank pin 12 extending from the latch bolt 7 into the interior of the door to retract the bolt on manual operation of the handles. The inner and outer handles 10 and 11 are pivotally attached to the respective sides of the door and arranged in a way to operate independently on the crank pin 12 to retract the bolt. The door may be locked from the inside by moving the inner handle 10 in a straight line movement as distinguished from its normal pivotal movement so as to block retraction of the bolt by the outer handle in a manner to be described.

Figure 3:
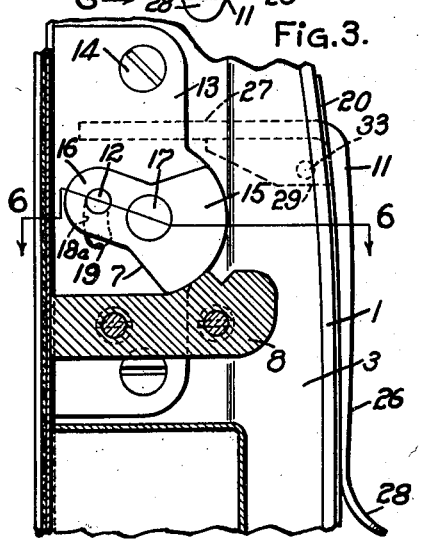
Fig. 3 is a section along the line 3—3 of Fig. 2.
Figure 4:
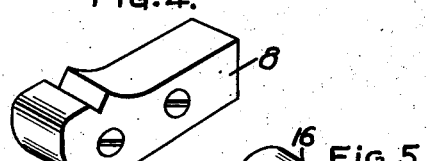
Fig. 4 is a perspective view of the latch keeper.
Figure 5:
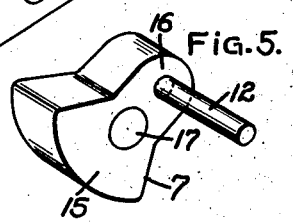
Fig. 5 is a perspective view of the latch bolt.

Referring particularly to Figs. 2, 3 and 6 of the drawings, a plate 13 is secured flush with the edge 3 of the door by means such as the screws 14. The latch bolt 7, which has a segmental latching portion 15 and a tail portion 16 (Figs. 3 and 5), is secured exteriorly of the plate 13 and adapted to pivot in a vertical plane on the pin 17. One end of the pin 17 extends into the plate 13 in a drive fit and is headed over on the inner surface of the plate 13, as most clearly shown in Fig. 6. The crank pin 12, secured in the tail 16 of the latch bolt by a drive fit, extends from the tail through a slot 18 in the plate 13 and an opening 18ᵃ (Fig. 14) in the edge 3 of the door horizontally into the interior of the door. The lower end 19 of the slot 18 may provide a stop cooperating with the crank pin 12 to limit rotation of the latch in an unlatching direction, as will be understood from inspection of Fig. 3.

Referring in detail to the construction of the outer handle 11 and its application to the side 1 of the door, a face plate 20 is secured to the outer surface of the side 1. The face plate provides an opening 21 in alignment with an opening 22 in the side 1 (Figs. 9 and 10). Spaced parallel ears 23 integral with the side 1 adjacent the opening 22 extend into the interior of the door in substantially perpendicular relation to the normal plane of the side 1, as most clearly shown in Fig. 9. The face plate 20 is secured to the side 1 through means such as the screws 24 (Fig. 7) and provides wing portions 25 integral with the plate adjacent the opening 21 and extending through the opening 22 of the side 1 in substantially parallel relation to the ears 23—23. The outer handle 3 preferably comprises a manually operative portion 26 normally disposed in vertical position adjacent the plate 20, as most clearly shown in Figs. 3 and 8, and a bolt-actuating portion in the form of an arm 27 in right-angular relation to the portion 26 and extending through the openings 21 of the plate 20 and the opening 22 of the side 1. The free end 28 of the manually operative portion 26 may be curved slightly outwardly away from the plate 20 enabling the handle to be easily grasped by the operator. A one-piece member 29 (Figs. 8 and 10) is assembled with the handle 3 in my preferred form and comprises a base plate 30 secured to the under surface of the arm 27 by any suitable means such as rivets 31 (Fig. 8) and spaced parallel wing portions 32 extending downwardly in right-angular relation to the base 30. The handle 11 is assembled in pivotal relation to the outer side 3 of the door through means of a pivotal pin 33 extending through the wings 25 of the face plate 20 and the wings 32 of the member 29 (Fig. 10). The ears 23 of the side 1 cooperates with the free ends of the pin to limit movement of the same, as most clearly shown in Figs. 9 and 10. A spring member 35 (Figs. 9 and 10) is assembled with the pin 33 of the outer handle and operates to return the handle from unlatching position to normal position, as will be understood by those skilled in the art. A spring member 36 (Figs. 7 and 10) having one end assembled with the pin 33 and its opposite end disposed beneath the crank pin 12 maintains the latch bolt 7 in latching position.

Operation of the outer handle 11 to unlatch the door is most clearly shown in Fig. 7. Thus it will be seen that when the manually operative portion 26 of the handle is moved outwardly away from the side 1 of the door, the handle pivots on the pin 33 causing the arm 27 to engage the crank pin 12 thus moving the crank pin in a downward direction so as to retract the latch bolt from the keeper 8. Retraction of the latch bolt is against the tension provided by the spring member 36 with the result that when pressure upon the handle is released, the latch bolt will return to normal latching position simultaneously with the return of the handle 11 to its normal position. It will be seen from inspection of Figs. 8 and 9 that when the handle 11 is in normal position, the arm 27 is disposed above the crank pin 12 in spaced relation thereto. This relative position of the handle 11 in normal position is important for reasons set out below in connection with cooperation of the inner handle with the outer handle to prevent unlatching of the door by the outer handle, as will be described.

Referring in detail to the construction of the inner handle 10 and its assembly with the inner door 2, the handle has a manually operative portion 37 projecting through the door casing 5, a control shaft 38 preferably assembled with the side 10 on the interior thereof, and an actuating portion or dog 39 extending in angular relation to the control shaft 38 at its opposite end from the manually operative portion 37. The control shaft 38 extends upwardly through a slot 40 (Fig. 16) of the casing 5 and has a notch 41 (Figs. 1 and 14) in one side thereof adjacent the manually operative portion 37 for cooperative fastener engagement with material of the casing 5 adjacent an end 42 of the slot (Figs. 15 and 16) for a purpose to be described. In my preferred construction an inwardly pressed embossment 43 is provided in the side 2 of the door having openings 44 therein to receive the control shaft 38, as most clearly shown in Fig. 2. A hook-shaped portion 45 (Figs. 1 and 13) may be struck from the side 2 of the door for supporting the control shaft intermediate the embossment 43 and its manually operative portion 37. As a means for supporting the control shaft 38 intermediate its ends for pivotal movement, supporting ears 46 and 47 are struck out of the embossment 43 to project toward the inside of the automobile (Fig. 12). The ear 46 has a portion 48 extending outwardly in right-angular direction to the side 2 and an upwardly extending portion 49 at its outer end substantially parallel to the side 2. The ear 47 extends outwardly from the side 2 in right-angular direction and preferably inclined relative to the ear 46 and cooperates with the ear 46 to receive the control shaft 38 between them, as most clearly shown in Fig. 12.

As a means for maintaining the inner handle in locking position, I have provided a fastener member having a substantially flat base 50 disposed between the side 2 and the control shaft 38. The base 50, as shown in Fig. 11, comprises spaced legs 51 integrally joined to a rectangular end portion 52. The end portion 52 has wing portions 53 at opposite ends extending laterally beyond the legs 51 and the legs 51—51 have laterally extending wing portions 54 at their free ends. The fastener member is maintained in assembly with the side 2 through engagement of the wings 53 and 54 behind the ends 55 of the supporting ears, as most clearly shown in Fig. 11. The fastener member 49 has a resilient tongue 56 integrally joined to the end portion 52 between the legs 51—51 and bent out of the plane of the base 50. A cup-shaped embossment 57 is formed in the tongue 56 adjacent its free end for cooperative fastener engagement through an opening 58 of the control shaft 38 to maintain the inner handle in locking position, as hereinafter more fully described.

Operation of the inner handle is carried out, when the handle is in normal unlocked position, shown in dotted lines in Fig. 14, by grasping the manually operative portion 37 and lifting the handle in an upward direction. During this action the control shaft 38 pivots on the end 59 of the angularly extending portion 48 of the supporting ear 46, as most clearly shown in Fig. 15. As a result of this pivotal action the actuating portion or dog 39 engages the crank pin 12 of the latch bolt to retract the bolt.

The inner handle is returned from its bolt-retracting position, shown in Fig. 15, to normal position, shown in dotted lines in Fig. 14, through the spring member 36 which has sufficient strength to overcome the weight of the inner handle and return the latch bolt to locking position, at the same time moving the inner handle to its normal position. It will be noticed that when the inner handle is in normal unlocked position, as shown in dotted lines in Fig. 14, the dog 39 is disposed substantially in engagement with the pin 12 laterally beyond the arm 27 of the outer handle. Furthermore, the width of the dog 39 is less than the distance in normal position of the outer handle between the arm 27 and the pin 12. Thus to lock the latch mechanism from the inside of the automobile, the inner handle is moved in a straight line direction and away from the edge 3 of the door to dispose the dog 39 between the arm 27 and the crank pin 12. During this action the slot 41 of the inner handle receives the edge 42 of the opening 40 locking the edge 60 of the inner handle adjacent the lower side of the slot 41 behind the casing 5 (Fig. 14) thus preventing movement of the handle in an upward position. As a result of this locking engagement of the inner handle and the window casing 5, it is impossible to move the dog 39 even though the arm 37 exerts pressure on the same in the direction of the pin 12 by attempted operation of the outer handle. Thus when the inner handle is in locking position, it is impossible to retract the latch bolt by the outer handle. During movement of the inner handle from normal position to locking position the opening 58 of the control shaft 38 moves into alignment with the embossment 57 of the fastener member 49, at which time the embossment snaps into the opening and engages the walls of the same, as shown in Fig. 17, so as to prevent unintentional movement of the inner handle from locked position to normal operating position. The inner handle may be purposefully moved from locked position to normal position through exerting sufficient force on the manually operative portion 37 in the direction of the door edge 3 to overcome engagement of the spring tongue 56 within the opening 58 of the control shaft 38.

It is understood that modifications and adjustments could be made in the latch mechanism without departing from the scope and spirit of my invention. Therefore, although I have illustrated and described preferred embodiments, I do not wish to be limited thereby as the scope of my invention is best defined in the following claims.

I claim:

1. A door latch mechanism comprising a latch bolt applicable to the edge of a door and pivoted exteriorly of the edge, said bolt having an arm forming a part thereof and extending into the interior of said door, inner and outer handles pivotally assembled with said door, said handles having actuating portions at their free ends disposed within said door and independently operable on said bolt in normal pivotal movement of said handles to retract said bolt, means forming part of said door supporting said inner handle and guiding said inner handle in straight line movement which is of said pivotal movement, said actuating portion of said outer handle being normally positioned above said arm in spaced relation thereto and said actuating portion of said inner handle being disposed laterally beyond said actuating portion of said outer handle in position to move between said arm and said actuating portion of said outer handle on said straight line movement of said inner handle thereby blocking operation of said actuating portion of said outer handle on said arm.

2. A door latch mechanism comprising a latch bolt applicable to the edge of a door and pivoted exteriorly of the edge, said bolt having an arm forming a part thereof and extending horizontally into the interior of said door, inner and outer handles having shafts pivotally assembled with said door, said shafts having actuating portions at their free ends disposed within said door and independently movable in vertical planes in normal pivotal movement of said shafts to retract said bolt, means forming part of said door supporting said inner handle and guiding said inner handle in straight horizontal movement which is independent of said pivotal movement, said actuating portion of said outer handle being normally positioned above said arm in spaced relation thereto and said actuating portion of said inner handle being disposed laterally beyond said actuating portion of said outer handle in position to move between said arm and said actuating portion of said outer handle on said horizontal movement of said shaft of said inner handle thereby blocking operation of said actuating portion of said outer handle on said arm.

HOWARD J. MURPHY.